US012776525B2

(12) # United States Patent
Burchardt et al.

(10) Patent No.: US 12,776,525 B2
(45) Date of Patent: Oct. 27, 2026

(54) ENERGY STORAGE SYSTEM USING SECOND LIFE BATTERIES

(71) Applicant: ECO STOR AS, Oslo (NO)

(72) Inventors: Trygve Burchardt, Howell, MI (US); Harvey Mancey, Hampshire (GB)

(73) Assignee: RECUBE AS, Oslo (NO)

( * ) Notice: Subject to any disclaimer, the term of this patent is extended or adjusted under 35 U.S.C. 154(b) by 741 days.

(21) Appl. No.: 18/069,833

(22) Filed: Dec. 21, 2022

(65) Prior Publication Data

US 2023/0139770 A1 May 4, 2023

Related U.S. Application Data

(63) Continuation of application No. PCT/US2021/039689, filed on Jun. 29, 2021.

(60) Provisional application No. 63/046,230, filed on Jun. 30, 2020.

(51) Int. Cl.
*H01M 10/48* (2006.01)
*H01M 10/42* (2006.01)
*H01M 10/54* (2006.01)

(52) U.S. Cl.
CPC ....... *H01M 10/482* (2013.01); *H01M 10/425* (2013.01); *H01M 10/54* (2013.01); *H01M 2010/4271* (2013.01); *H01M 2220/20* (2013.01)

(58) Field of Classification Search
CPC ........... H01M 10/4207; H01M 10/425; H01M 10/482; H01M 10/54; H01M 2010/4271; H01M 2220/20; H02J 2310/48; H02J 7/00032; H02J 7/00047; Y02E 60/10; Y02T 10/70
See application file for complete search history.

(56) References Cited

U.S. PATENT DOCUMENTS 9,091,737 B2 * 7/2015 Tzivanopoulos ... H01M 10/482
2003/0008201 A1 1/2003 Komori et al.
2013/0018610 A1 1/2013 Yamauchi et al.
(Continued)

FOREIGN PATENT DOCUMENTS

CN 105977553 9/2016
WO WO-2021/014363 1/2021

OTHER PUBLICATIONS

Machine translation CN105977553B (Year: 2019).*
(Continued)

*Primary Examiner* — Victoria H Lynch
(74) *Attorney, Agent, or Firm* — Foley & Lardner LLP

(57) ABSTRACT

Systems and methods herein are directed to the reuse of a plurality of complete battery packs for electric vehicles (EV) within an energy storage system. The system can include a plurality of battery interface units that are each operably coupled to each of the plurality of battery packs. The system can include a central battery controller operably coupled to each of the battery interface units. The central battery controller can be configured to receive signals from each of the plurality of battery interface units and determine, based on the received signals, an operating condition for each of the plurality of battery packs. The central battery controller can be configured to send a control signal to each of the battery interface units that causes each of the battery packs to operate based on the operating condition. The battery packs can have different configurations.

20 Claims, 7 Drawing Sheets

(56) References Cited

U.S. PATENT DOCUMENTS

| | | | | |
|---|---|---|---|---|
| 2013/0090872 | A1 | 4/2013 | Kurimoto | |
| 2014/0084843 | A1 | 3/2014 | Pham et al. | |
| 2016/0240898 | A1 | 8/2016 | Koba et al. | |
| 2017/0163054 | A1 * | 6/2017 | Suda | H02J 7/0014 |
| 2018/0105060 | A1 | 4/2018 | Mcquillen et al. | |
| 2018/0257506 | A1 | 9/2018 | Thieme et al. | |
| 2019/0165583 | A1 | 5/2019 | Lee et al. | |

OTHER PUBLICATIONS

Foreign Search Report on PCT PCT/US2021/039689 Dtd Oct. 5, 2021.

Extended European Search Report in EP 21833182.5 dated Aug. 12, 2024 (14 pages).

* cited by examiner

ENERGY STORAGE SYSTEM USING SECOND LIFE BATTERIES

CROSS-REFERENCE TO RELATED PATENT APPLICATIONS

This application is a Continuation of PCT/US2021/039689, filed Jun. 29, 2021, which claims priority to U.S. Provisional Patent Application No. 63/046,230, filed Jun. 30, 2020, both of which are incorporated herein by reference in their entireties.

BACKGROUND

The present disclosure relates to a method for reusing an electric vehicle (EV) battery, and more particularly to a method for using an electric vehicle battery within an energy storage system by locally or remotely controlling the management system of the battery without opening the case sealing the battery pack and battery monitoring system.

Further, the present disclosure relates to a method for reusing EV batteries reclaimed from various manufacturers with various different specifications and performance, such that the EV batteries can be used individually or connected together to form an energy storage system.

Further, the present disclosure relates to a system and method to accomplish charge and discharge balancing of complete second life electric vehicle batteries to maximize safety, reliability, cycle life and calendar life.

The potential to use a complete EV battery in an energy storage application provides a number of significant advantages. EV batteries are designed to provide a combination of outstanding safety and reliability combined with very high-power delivery and high energy density. Due to their high volume of production, EV batteries are also uniquely able to achieve these high technical standards at low cost. These features enable a range of new configurations in an energy storage system and also the invention of new system architectures that would otherwise be cost prohibited by the use of new batteries.

Generally, a used EV battery contains a large number of single battery cells or battery modules, packaged into a hermetically sealed chassis or enclosure, connected together in parallel and/or series to give the required capacity, power and voltage. In addition, the EV battery contains a battery management system that monitors the performance of the batteries and ensures safe operation. To comply with automotive safety standards, a number of sensors are included into the battery pack. Historical data such as, but not limited to, temperature during charge and discharge, state of charge and state of discharge, cycle number, cell voltages, internal impedance etc., are all gathered during the first life (automotive) of the battery and monitored by the BMS (Battery Management System).

For second life use of electric vehicle batteries removal of the battery, opening the sealed case and taking out the cells or modules has been the generally preferred path. The battery cell or module voltages, capacities, impedance and other parameters can then be monitored and the cells or modules can be sorted and selected for reuse into different applications. This process is time consuming and expensive. This has been the preferred approach to solve three potential challenges when repurposing second life batteries. The first challenge has been, to date, thought to be that second life batteries are likely to contain faulty or high impedance cells that would significantly limit the performance of the battery. The second challenge has been that the BMS is difficult to access and repurpose. The third challenge has been that the battery voltage and capacity might not be ideally suited to all potential second life applications.

Recent studies have shown that the first challenge is, in fact, incorrect. Data suggests that although some batteries do develop faults the majority of batteries suitable for second life application are in fact in the range of about 50-90% capacity with very low distribution of cell capacity and impedance values.

The sourcing of batteries for automotive applications places very stringent requirements on the battery manufacturers and, as such, a limited number of manufacturer's products are accepted. In addition, the BMS developed for automotive use is much more advanced than those commonly used in low cost consumer electronics and power tools. The result is that the battery performance after use in an automotive application may be much better than anticipated.

This presents the opportunity for development of innovative methods to reuse the complete battery in energy storage systems with a focus on system integration, hardware and software controls.

Although, there are many environmental and cost benefits derived from using an unopened EV battery, few methods have been disclosed that describe the benefits that an unopened EV battery enables when used as an energy storage system in a renewable energy system.

Accordingly, it would be advantageous to provide a system for reusing batteries and, particularly EV batteries, which is cost-effective, efficient, and does not require battery opening.

SUMMARY

The following summary is illustrative only and is not intended to be in any way limiting. In addition to the illustrative aspects, embodiments, and features described above, further aspects, embodiments, and features will become apparent by reference to the following drawings and the detailed description.

According to at least one aspect of the present disclosure, a method for using unopened electric vehicle batteries within a renewable energy system can include receiving via a central controller within the energy storage system, a first signal from a first control unit coupled to a first electric vehicle battery of the plurality of electric vehicle batteries. The method can include receiving, via the central controller within the energy storage system, a second signal from a second control unit coupled to a second electric vehicle battery of the plurality of electric vehicle batteries. The method can include processing, via a processor communicably coupled with the central controller, the first signal received from the first control unit and the second signal received from the second control unit. The method can include determining, via the processor, a first performance status of the first electric vehicle battery based on the received first signal and a second performance status of the second electric vehicle battery based on the received second signal. The method can include determining, via the processor, an operating condition for each of the first and second electric vehicle batteries based on the first and second performance statuses. The method can include sending, via the central controller, responsive to the determination of the operating conditions, a first control signal to the first control unit coupled to the first electric vehicle battery and a second control signal to the second control unit coupled to the second electric vehicle battery. The first control signal can cause the first control unit to operate the first electric vehicle battery based on the desired operating conditions and the second control signal causes the second control unit to operate the first electric vehicle battery based on the operating conditions. The first electric vehicle battery can include a different battery configuration than the second electric vehicle battery.

According to at least one aspect of the present disclosure, an energy storage system for reusing unopened second life electric vehicle batteries can include a plurality of electric vehicle batteries and a plurality of battery control units each operably coupled to each of the plurality of electric vehicle batteries. A first electric vehicle battery of the plurality of electric vehicle batteries can include a different battery configuration than a second electric vehicle battery of the plurality of electric vehicle batteries. The energy storage system can include a central controller operably coupled to each of the plurality of battery control units. The controller can receive a first signal from a first control unit coupled to the first electric vehicle battery and a second signal from a second control unit coupled to the second electric vehicle battery. The controller can determine a status of the first electric vehicle battery based on the first received signal and a status of the second electric vehicle battery based on the second received signal. The controller can determine a first voltage measurement of the first electric vehicle battery and a second voltage measurement of the second electric vehicle battery. The controller can determine an operating condition of the first electric vehicle battery based on the first voltage measurement and the second voltage measurement. The controller can send, responsive to the operating condition, a control signal to the first control unit coupled to the first electric vehicle battery.

According to at least one aspect of the present disclosure, an energy storage system for reusing unopened second life electric vehicle batteries can include a first reused electric vehicle battery from a first vehicle, a second reused electric vehicle battery from a second vehicle, a first battery control unit each operably coupled to the first reused electric vehicle battery and a second battery control unit coupled to the second electric vehicle battery. The first vehicle can be distinct from the second vehicle. The system can include a central controller operably coupled to each of the first and second battery control units. The controller can receive a first signal from the first control unit coupled to the first reused electric vehicle battery and a second signal from the second control unit coupled to the second reused electric vehicle battery. The controller can determine a status of the first reused electric vehicle battery based on the first received signal and a status of the second reused electric vehicle battery based on the second received signal. The controller can determine a first input of the first reused electric vehicle battery and a second input of the second reused electric vehicle battery. The controller can determine an operating condition of the first reused electric vehicle battery based on the first input and the second input. The controller can send, responsive to the operating condition, a control signal to the first control unit coupled to the first reused electric vehicle battery.

BRIEF DESCRIPTION OF THE DRAWINGS

A clear conception of the advantages and features constituting the present disclosure, and of the construction and operation of typical mechanisms provided with the present disclosure, will become more readily apparent by referring to the exemplary, and therefore non-limiting, embodiments illustrated in the drawings accompanying and forming a part of this specification, wherein like reference numerals designate the same elements in the several views, and in which.

DETAILED DESCRIPTION

Figure 1:
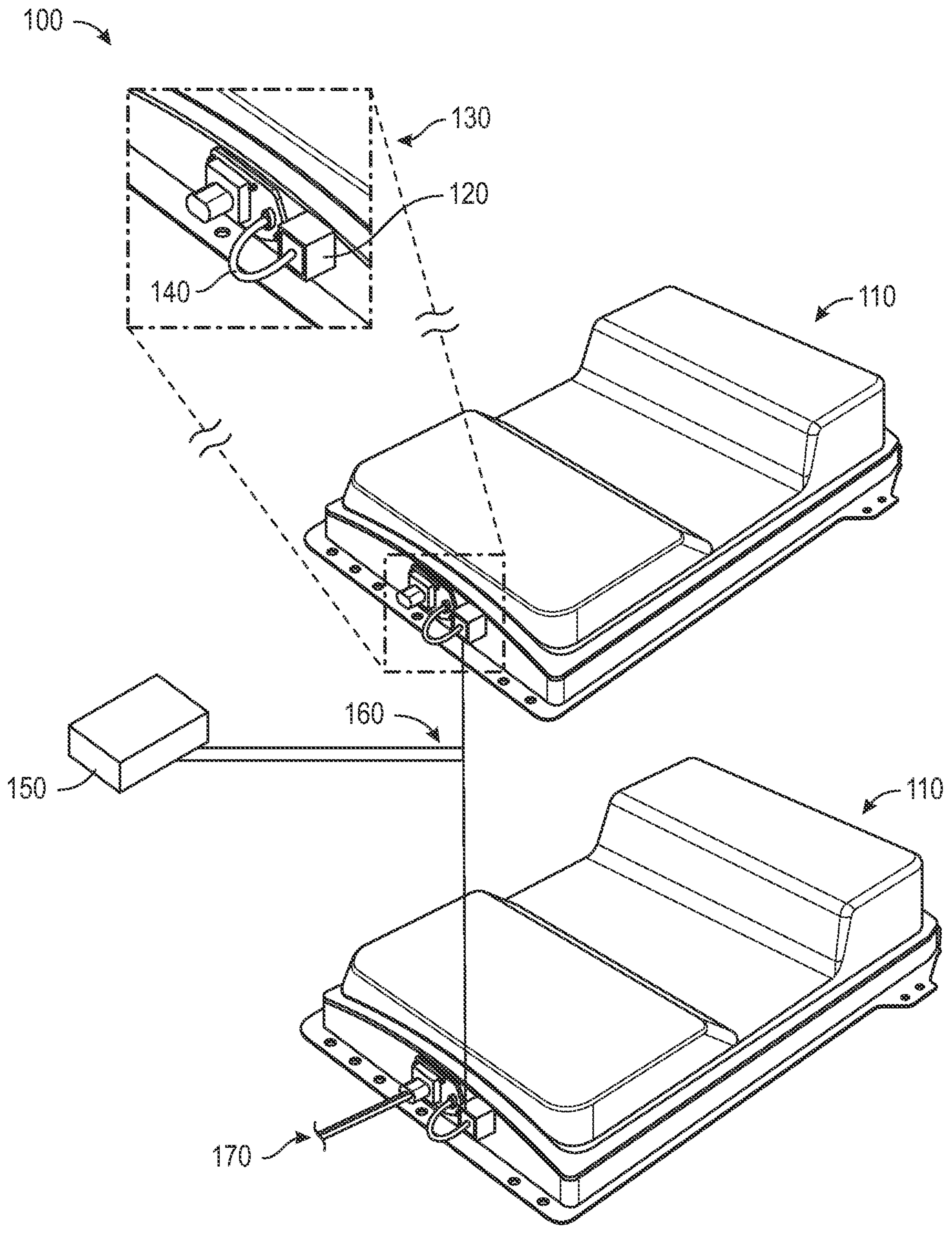
FIG. 1 shows a portion of a second life battery system having a central control unit communicably coupled to an EV battery interface, according to an exemplary embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

There is a perception that the cell voltages and impedance in an EV battery are unbalanced (e.g., inoperable) after the end of its useful automotive life. Further, there is a perception that the capacity may be low and that generally the state of the complete unopened battery may be negatively impacted by low capacity or faulty cells. This perception may arise at least in part from the fact that such batteries may be subjected to a variety of very demanding environmental conditions during their useful life. In an electric vehicle, the battery pack is required to operate at low and high temperatures in addition to delivering and receiving very high power for acceleration and fast charging. With the end user responsible for battery charging, the battery is sometimes fully charged over a long period but can also be subject to very short partial charges. The battery is, therefore, operated at numerous partially charged and discharged states. However, recent studies have shown that these perceptions may not align with actual circumstances. For example, a battery pack after the end of its useful life in automotive has applications may, in fact, have cells that are mostly well balanced (e.g., operable), allowing for the possibility that a complete and unopened battery can operate well when repurposed for second-life applications.

Further, there are various types of EV batteries returning from the market (e.g., recycled) that include different configurations. For instance, various brands of electric vehicles may use different manufacturers for batteries in which each battery may incorporate varying voltages, capacities, and/or chemical makeup (e.g., LMO, LFP, NMC cathodes). The rate of deterioration of these varying types of batteries may be difficult to measure depending on several factors (e.g., extent of use, warranty, crash damage, etc.) and the State of Health (SoH) may vary considerably. For instance, some batteries may have been exposed to various extreme temperatures, while others may not have. Therefore, each battery may have different remaining capacity.

Accordingly, it is also among the objectives of the present disclosure to provide a method and system that will facilitate the construction of a renewable energy system with an energy storage system using unopened second life EV batteries and, in particular, using unopened second life EV batteries of varying configurations (e.g., different number of cells, voltage, capacity, brand, chemistry, physical structure/configuration, SoH, etc.). Due to the nature of the chemicals in the battery, the cells and/or modules from an opened battery pack are classified as dangerous waste and require safe storage, handling, and recycling—further increasing costs associated with second life batteries. Accordingly, using unopened batteries may reduce costs and excess waste within the renewably energy system.

It is further among the objectives of the present disclosure to provide a method and system that enables a Master (Battery Control Unit, "BCU") and Servant (Battery Interface Unit, "BIU") configuration in the energy storage system to enable modular construction and control of systems with a single battery or many batteries connected in parallel and/or series.

It is further among the objectives of the present disclosure to provide a method and system that enables a flexible and multi-purposed renewable energy system that can be network connected (wired or wireless) to enable control and communication of system performance.

It is further among the objectives of the present disclosure to provide a method and system that enables individual batteries to be switched on and off using internal and/or external contactors to balance charge and discharge and allow safe removal of an individual battery for servicing/replacement.

The presented disclosure is generally directed to the use and preparation of an electronic control system consisting of a servant (BIU) and master (BCU) control unit system. The BIU unit is designed to connect to a complete and unopened second life electric vehicle battery to provide monitoring and control functions via a CANbus or other communication protocol (e.g., Modbus, Modbus TCP, I2C, SPI, etc.). The BCU unit is designed to allow connection of multiple BIU units to provide a central control and interface for multiple batteries such that they can be connected in a series and/or parallel configuration to provide a higher voltage and/or capacity.

Further, the present disclosure provides a method for an innovative use of the second life batteries in energy storage systems, and in combination with renewable energy sources.

Energy storage has been proposed by many as a solution for handling the intermittent power delivery from renewable sources, such as, but not limited to wind and solar. The challenge is that energy storage solutions are expensive to design and require significant investment to manufacture and certify. Further, when a battery is used to store energy, the battery is charged and discharged using DC (direct current) power. To be able to deliver stored energy to an energy grid, or for use in a building, the DC energy must be converted to AC (alternating current). As such, a type of bidirectional inverter is typically needed, adding additional system costs.

The use of unopened second life EV battery packs enables some unique features compared to most other energy storage batteries. The power rating of EV batteries is very high due to automotive requirements such as, but not limited to, fast charging and acceleration. Further, each unopened EV battery is delivered with an internal BMS (battery management system) that can be utilized. This adds a large degree of operational flexibility to an energy storage system when it is constructed from unopened second life EV batteries. This takes advantage of the fact that when the second life EV battery is used unopened, the BMS is repurposed. With a proposed BIU unit connected to the BMS of each second life EV battery, each battery can be made to operate independently or as part of a group within the system.

Referring generally to the figures, a renewable energy system that uses an energy storage system configuration may contain one or more battery control units (BIU), which may each be connected to an interface for a battery (e.g., EV battery), according to at least one aspect of the present disclosure. The battery control unit (BIU) may be configured to send and receive electrical signals from a BMS within EVs to a central controller system (BCU). The battery control unit (BIU) and central controller system (BCU) may have an embedded processor and/or another non-transitory computer-readable medium, which may include one or more programmed algorithms stored thereon to read the electrical signals associated with the BMS and send corresponding appropriate responses via the central controller system (BCU) such that the BMS operates based on signals to or from the central controller system (BCU). In various embodiments, the algorithms for operating methods may include reading a resulting voltage, current, or state of charge for an individual cell/cell module within the EV battery (or all cells/modules within the battery), and calculating if the voltage, current, or state of charge is within a present range. Accordingly, if it is determined by the battery control unit (BIU) that a resulting voltage, current, or state of charge (e.g., as characterized by a change in a measured voltage, charge, or load) for a particular cell/module or battery is lower or higher than desired (e.g., does not meet a predetermined threshold rate), the central controller system (BCU) may be configured to send a control signal to the corresponding battery control unit (BIU) which can cause the corresponding battery BMS to stop, rest, or limit further use of the particular cell/module or battery. Further, the central controller system (BCU) may send appropriate signals to the BMS that enable the battery to enter one or more predetermined modes including, but not limited to, safe start up and/or shut down, standby mode, charging or discharging, etc. Further, the central controller system (BCU) may gather data from a battery control unit (BIU), translate it, and display it on a user interface for an operator or user to view pertinent information related to an operating condition of the battery. In various embodiments, the central controller system (BCU) may be configured to receive input, via the user interface, from one or more users. In various embodiments, the central controller system (BCU) may be configured to receive a query from a user, to enable determination of a battery-related parameters including, but not limited to, voltage, current output, state of charge, state of health, time in service, etc. In some embodiments, the central controller system (BCU) may be configured to receive an input, via the user interface, causing the battery control unit (BIU) to operate in one or more predetermined modes (e.g., safe start up, safe shut down, standby, charge, discharge, etc.).

According to at least one embodiment of the present disclosure, the central controller system (BCU) can be used as a renewable energy system with an energy storage system that uses an unopened second life EV battery, or in an energy storage system where several EV batteries are mutually coupled (i.e., to form a larger energy storage system). In larger energy storage systems, a battery control unit (BIU) connected to each EV battery may be communicably coupled to the central control system (BCU). In various embodiments, the central controller system (BCU) may receive data from each individual battery pack through the battery control units (BIU) and direct energy delivered to (e.g., from an electrical grid and/or renewable energy sources) and/or received from each of the EV battery packs according to one or more loads or charges coupled to or associated with each of the individual EV battery packs (e.g., a battery/battery pack having a relatively high or low power rating may be coordinated with one or more high or low power applications, respectively, by the central controller system). This provides the benefit of reduced cost for an energy storage system that can deliver high power and with a unique flexibility of use, where each second life EV battery in the energy storage system is able to operate as an independent energy storage system.

In various embodiments, the production of an energy storage system having reused EV batteries may include a reduction in carbon dioxide when compared to an energy storage system that has new (e.g., not reused) EV batteries. Generally, the manufacture of new batteries creates a production of carbon dioxide. Accordingly, the use of second life batteries reduces carbon dioxide by not only avoiding the need to produce new batteries, but also increasing the lifetime of existing batteries and delaying their final disposal (e.g., landfill, etc.).

In various embodiments, the use of a bidirectional inverter, or PCS (Power Conversion System) between the energy storage system, an energy grid, and a building can give the central controller system (BCU) the ability to monitor and deliver alternate current ("AC") energy to the building and to purchase AC energy from the grid or sell surplus to the grid. For example, within the energy storage system, the bidirectional invertor can be configured to convert the direct current ("DC") power output of the battery to be delivered to the energy grid when the battery is discharging. As another example, the bidirectional invertor can be configured to convert the AC power from the grid to energy configured to DC power configured to charge the battery.

In various embodiments, the battery control unit ("Battery Interface Unit," BIU) can include the ability to be connected directly to a second life electric vehicle battery using existing interface connectors. The BIU in communication with the central controller system ("Battery Control Unit," BCU) can directly send signals to and receive signals from the internal Battery Management System (BMS) to control operation of the battery functions. The BIU and BCU can provide an external method of control where it is not possible to interface directly with the batteries internal systems. The BIU and BCU can be used to control battery functions and provide real time access to battery performance data. For example, the BIU and BCU can control operation of the battery contactors for the purposes of turning a single battery (e.g., battery pack) on and off locally and/or remotely as required or dynamically balancing a group of batteries (e.g., turning one or more battery packs on or off) when units of different capacities and impedances are connected together in parallel or series. The function of isolating individual batteries enables the BCU unit to switch load and charge between individual batteries to ensure optimum performance and even out the rate of battery degradation. The BIU and BCU can be connected to the battery or a vehicle communication interface to monitor battery performance status while the battery is being used in host vehicle (e.g., while a host vehicle operates using electronic charge from battery pack). The BIU and the BCU can be connected to a wired and/or wireless internet connected device in order to transmit and/or receive data.

In various embodiments, the BCU can receive inputs from multiple BIU units to enable configuration and control of larger battery arrays formed from multiple series and/or parallel connected batteries. The BCU can be connected to a user interface (e.g., computer, phone, television, screen, etc.) to provide users with the ability to view and control battery functions. The BCU can be connected to wired and/or wireless internet connected device in order to transmit and/or receive data. The BCU can be connected to a wired and/or wireless locally connected device in order to transmit and/or receive data.

In various embodiments, the BCU can include an algorithm that monitors production and consumption of energy. The algorithm can use information including, but not limited to, energy price, weather forecasting, customer demand, diagnostic information and historical performance information about the previous life of the batteries to control the selection and use of each battery within the energy storage system. For instance, if one or several of the batteries in the energy storage system shows symptoms of strain, the batteries can be turned off or cycled at a lower capacity and/or power to limit degradation and impact on the system. Full discharge and charge cycles are known to accelerate deterioration of the battery. This configuration of control can provide a prolonged lifetime of the reused EV batteries within the system.

In various embodiments, the energy storage system can include the ability of the BCU to integrate single or multiple batteries both during initial production and while remaining in operation (e.g., during normal operation). Battery type and performance can be uploaded to the BCU controller manually or automatically by the BIU unit of each battery, allowing the BCU to detect, via one or more signals, the removal or addition of a battery and send one or more control signals to a BIU to adjust the energy storage system (e.g., change the state of a battery) based on the control signal. In various embodiments, the BCU can detect the addition or removal of one or more different batteries (e.g., different size, configuration, etc.) For instance, the BCU can be configured to detect the removal of a first battery within the system (e.g., a first size, first voltage, first capacity, etc.) based on one or more signals from a first BIU coupled with the first battery and send one or more control signals to a second BIU to adjust the system (e.g., change the state of a battery) of a second battery (e.g., a second size, second voltage, second capacity, etc.). In various embodiments, the different batteries can be manufactured, produced, or otherwise provided by various OEMs (Original Equipment Manufacturer).

FIG. 1 shows an example of a battery 110 within a second life battery energy storage system 100, according to an exemplary embodiment. The battery 110 may be a second life battery or battery pack that is unopened after removal from a first life use or application. In various embodiments, the battery 110 may be configured to provide energy and/or power to one or more energy systems including, but not limited to, fast charge stations, buildings, EVs, backup storage systems, etc.

As shown in FIG. 1, the battery 110 may include a battery interface 130. For example, the battery interface 130 may include a battery interface unit (BIU) 120 operably coupled to a portion of the battery 110. For example, the BIU 120 may couple to a portion of the battery 110 through one or more interface cables 140 or wirelessly through a wireless connection point. In various embodiments, the BIU 120 is configured to connect to the complete and unopened second life electric vehicle battery 110 to provide monitoring and control functions via a CANbus or other communication protocol (e.g., Modbus, Modbus TCP, I2C, SPI, etc.). The BIU 120 can be coupled to the battery 110 through a low-voltage multi-contact connector and cable that can be coupled with a battery communications interface connector. In various embodiments, the battery communications connector may be mounted on the exterior of the battery 110. In various other embodiments, the communications connector may be contained within the external enclosure, as described in greater detail below. The BIU 120 can be operably coupled with a battery control unit (BCU) 150, such as through a master interface cable 160 or wirelessly through a wireless connection point. The battery 110 may include one or more power cables 170 coupled with that battery. In various embodiments, the power cables 170 may include a connection directly to a DC-powered system, wherein the resulting DC voltage and current may be controlled via a DC controller included within the BCU 150.

Figure 7:
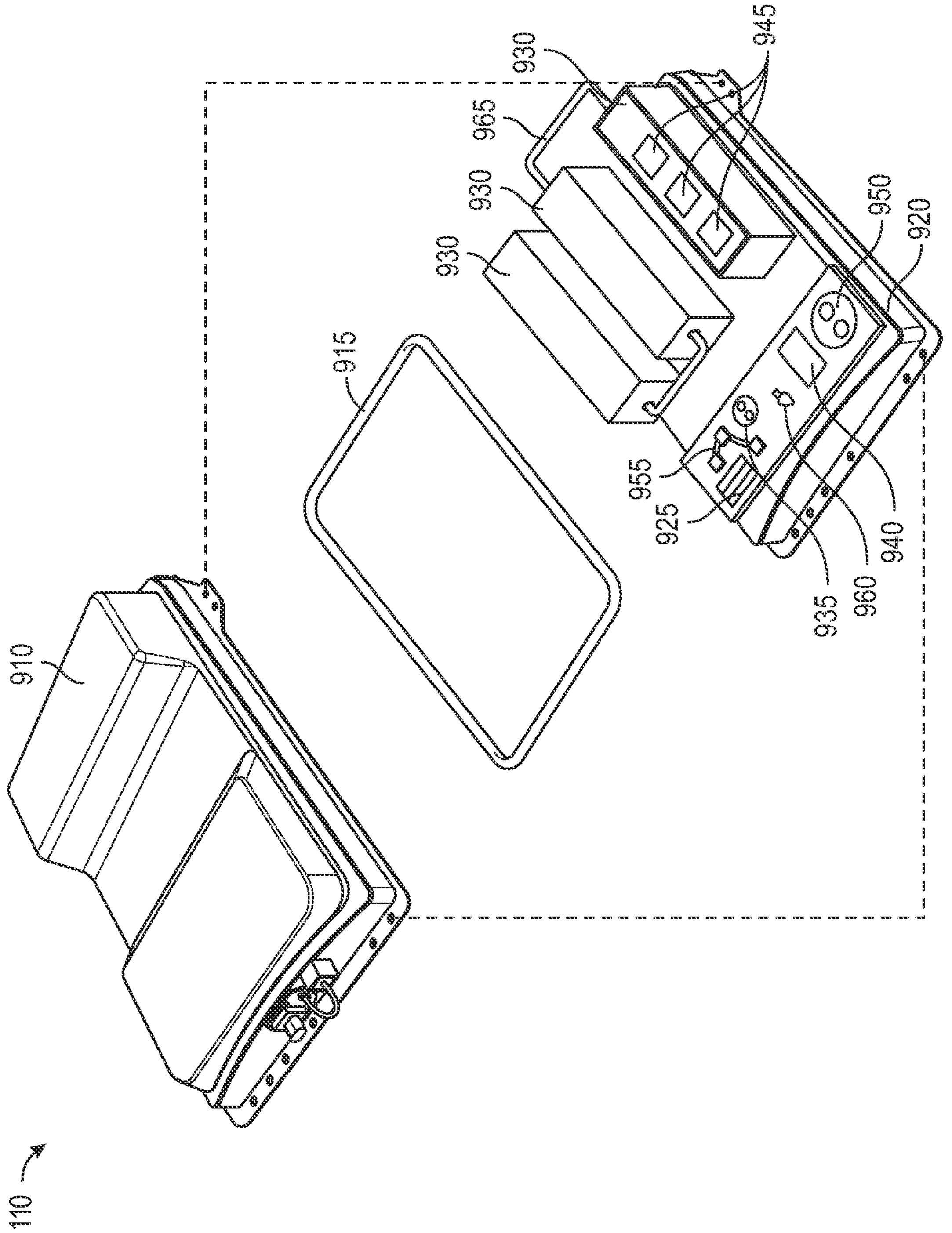
FIG. 7 shows a perspective exploded view of a portion of an EV battery, according to an exemplary implementation.

As shown in greater detail in FIG. 7, a second life EV battery 110 can include an external enclosure 910. For example, the enclosure 910 can couple with a base 920 through various means (e.g., fasteners, welding, injection molding, etc.) to provide the internal components with protection from impact and the environment (e.g., impact, thermal changes, etc.). The enclosure 910 can be made from metal or plastic and can be contained within a chassis of the electric vehicle or form part of the vehicle structure. For example, the enclosure 910 may include one or more gaskets 915 (e.g., seals and fixings), such that the enclosure 910 couples the battery 110 to an electric vehicle while creating a fluid-tight seal. By way of example, the battery 110 can include one or more power contacts 950, interface contacts 960, battery modules 930, cell modules 945, interconnections 955, a battery management system (BMS) 940, signal cables 965, contactors 935, and a circuit breaker and/or fuse 925. In various embodiments, the external enclosure 910 can contain (e.g., enclose) the power contacts 950, interface contacts 960, battery modules 930, cell modules 945, interconnections 955, a BMS 940, signal cables 965, contactors 935, and circuit breaker and/or fuse 925, as well as various other components.

The power contacts 950 can form the interface between the battery 110 and the host vehicle via power cables 170. The power contacts 950 may be rated for high voltage DC and may be able to conduct high current. The power contacts 950 often include a locking mechanism to ensure the power cables 170 cannot disconnect accidentally during normal use. The power contacts 950 may be made from plastic and contain metal contacts manufactured from copper, brass or other suitable contact material (e.g., various other metals). The interface contacts 960 may allow a vehicle control system, external diagnostic system, or BIU 120 to communicate with the BMS 940 via the signal cable 965. This communication may enable control and operation of the battery 110 and may provide the external control system with technical and performance data from the battery 110 such as, but not limited to, individual cell voltages, module voltages, internal impedance, temperature and number of cycles. Cell modules 945 may contain one or more rechargeable battery cells. Each cell can be assembled using an anode and cathode, solid, gel or liquid electrolyte and a metallic or plastic can/case with contacts for positive and negative connections. The cells may be connected in series and/or parallel configurations to increase the module voltage and capacity. The cell module 945 may contain safety features and may form an electrical and mechanical 'building block' for construction of a larger battery module 930 or complete electric vehicle battery system.

Battery modules 930 can incorporate a number of battery cells or cell modules 945 to form a higher voltage and capacity 'building block.' The battery module 930 may contain safety features and components of the BMS 940 and may form an electrical and mechanical 'building block' for construction of a complete electric vehicle battery system (e.g., battery pack). The BMS 940 can connect to individual battery cells, cell modules 945, and/or battery modules 930 and can provide monitoring and control of several features including, but not limited to, individual cell voltages, module voltages, internal impedance, temperature and number of cycles. The battery management system 940 can be configured to monitor and/or control operation of the batteries 110 to ensure optimum performance and safety. The BMS 940 can include a printed circuit board fitted with electronic components including, but not limited to, microprocessors, microcontrollers, memory, interface devices and other discrete components. The BMS 940 may also incorporate firmware and software, relays, contactors 935, fuses and/or other safety devices. The contactors 935 can be connected to a positive and negative terminal of the battery 110 and can be configured to switch the battery 110 power on and/or off. The control signal to open or close the contactors 935 can come from the vehicle control system, diagnostic system, BIU 120, or BCU 150, via the interface contacts 960. The contactors 935 can contain metallic contacts that may be sealed and surrounded by an inert gas for preventing arcing and oxidization. Circuit breakers and/or fuses 925 may be connected in series with the battery 110 and may provide a safety mechanism to prevent the discharge or charge current from exceeding safe limits. The fuse 925 can include a single-use fuse or a fuse that may be programmable to be used more than once. The fuse 925 may be contained in a removable cartridge to allow easy and rapid disconnection of the battery 110.

Figure 2:
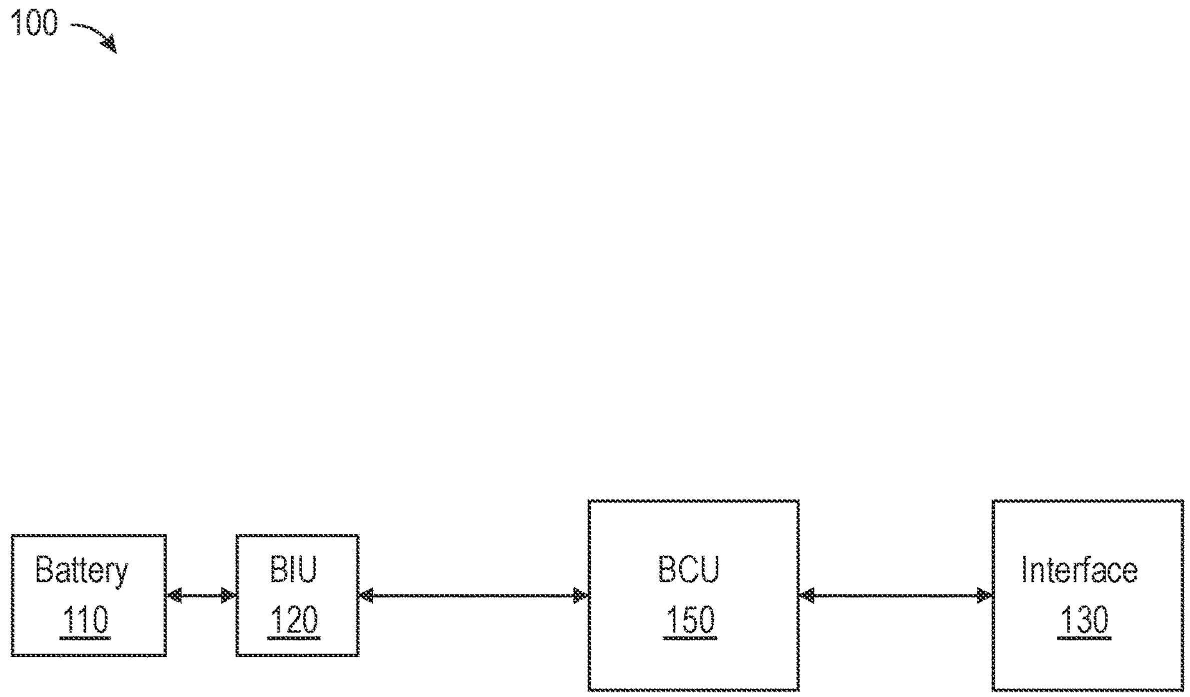
FIG. 2 shows a schematic drawing of a second life battery system having a single battery connected to a battery control unit and a central controller, according to an exemplary embodiment.

FIG. 2 shows a schematic representation of the battery 110 within a second life battery energy storage system 100, according to an exemplary embodiment. As shown in FIG. 2, the unopened battery 110, which may include the BMS 940, is operably coupled to the BIU 120, which is operably coupled to the BCU 150. In various embodiments, the battery 110 is operably coupled to BIU 120 such that the BIU 120 can be configured to send/receive one or more signals to/from the battery 110. In various embodiments, the one or more signals may include an impedance, capacity, state or depth of charge (DoC), state or depth of discharge (DoD), one or more performance metrics (e.g., charge/discharge efficiency), a status (e.g., state of health, state of charge, etc.) associated with the battery 110, etc. In various embodiments, the BIU 120 may include hardware and software required to communicate and process the signals (e.g., voltage, current, etc.) that may be received from the battery 110 and/or the BCU 150. In various embodiments, the BCU 150 may include hardware and software required to communicate and process the signals (e.g., voltage, current, etc.) that may be received from the battery 110 and/or the BIU 120. The hardware may include, but is not limited to, one or more controllers, one or more processors and/or microprocessors (e.g., CPU), a memory, etc. In various embodiments, the hardware may also include a housing to contain the one or more controllers, processors, and/or memory. In various embodiments, the BCU 150 may include software that includes one or more algorithms to facilitate reading signals received from the battery 110 and enable the BIU 120 to send appropriate control signals in response. In various embodiments, the BIU 120 may be operably coupled to the BCU 150 through a wireless connection. For example, the BCU 150 may include a wireless access point (e.g., to enable wireless communications and control) and an operator interface 250 (e.g., user interface). The operator interface 250 may be configured to give a user access to control over the battery 110.

Figure 3:
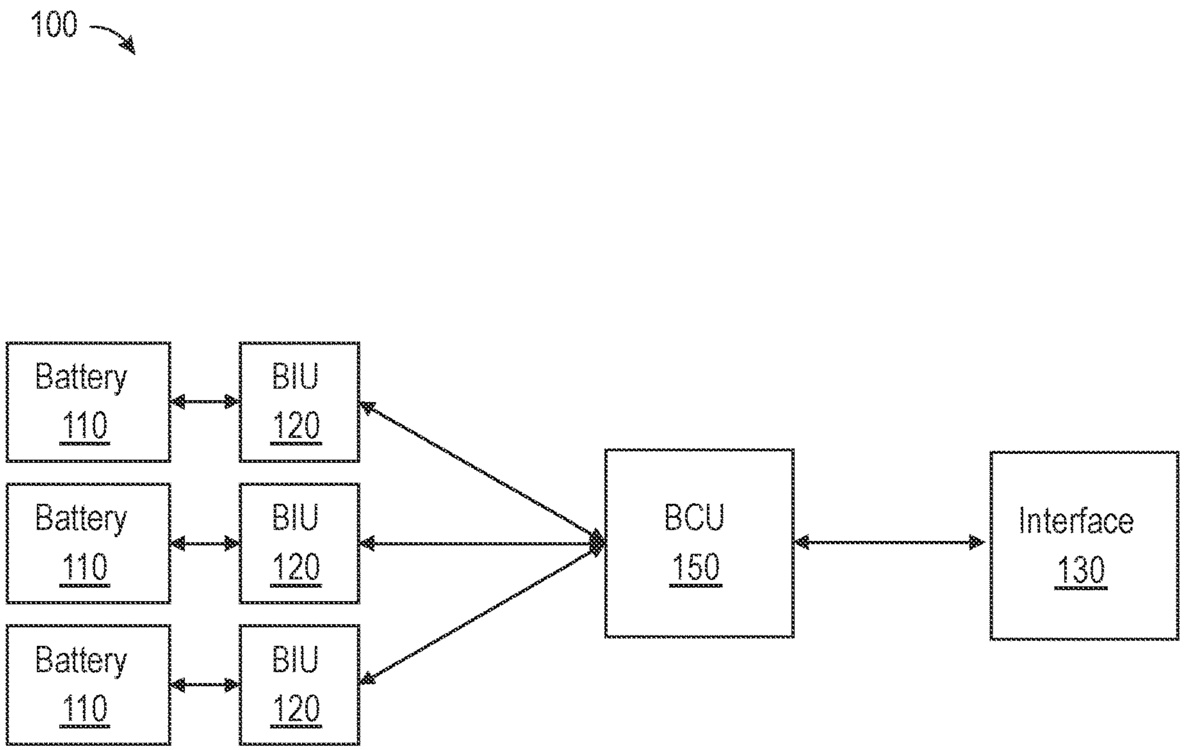
FIG. 3 shows a schematic drawing of a second life battery system having a plurality of batteries connected to a battery control unit and a central controller, according to an exemplary embodiment.

FIG. 3 shows a schematic representation of a plurality of batteries 110 within a second life battery energy storage system 100, according to an exemplary embodiment. As shown in FIG. 3, the unopened batteries 110, which may each include a BMS, are each operably coupled, via one or more wires or wireless connection points, to a corresponding BIU 120. Each BIU 120 may be operably coupled to a single BCU 150 such that the BCU 150 can send and/or receive control signals to each BIU 120 within the energy storage system 100. The batteries 110 can each operably couple to the corresponding BIU 120 such that the BIU 120 can be configured to send/receive one or more signals to/from the battery 110. Although FIG. 3 shows an energy storage system 100 including three EV batteries 110, various embodiments of energy storage systems 100 can include any number of EV batteries 110.

Figure 4:
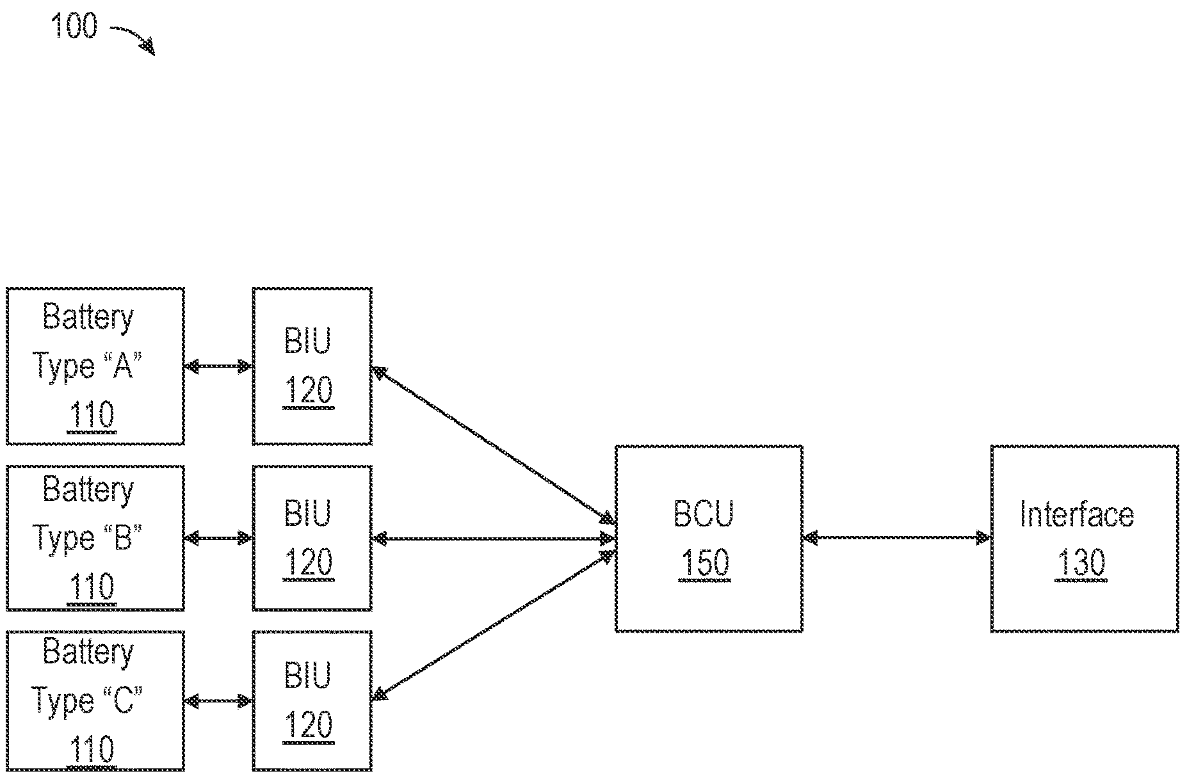
FIG. 4 shows a schematic drawing of a second life battery system having a plurality of different batteries connected to a battery control unit and a central controller, according to an exemplary embodiment.

FIG. 4 shows a schematic representation of a plurality of batteries 110 within a second life battery energy storage system 100, according to an exemplary embodiment. As shown in FIG. 4, the system 100 may include different types of batteries 110 that are each operably coupled, via one or more wires or wireless connection points, to a corresponding BIU 120. Each BIU 120 can operably couple to a single BCU 150 such that the BCU 150 can send and/or receive control signals to each BIU 120 within the energy storage system 100.

Each of the various types of batteries 110 shown in FIG. 4 may include different voltages. By way of example, the batteries 110 may each include a DC voltage output within a range of 200 Volts to 800 Volts DC. Within the energy storage system 100, the BCU 150 can be configured to detect a voltage output of a specific battery 110 within the system 100 based on a signal from the corresponding BIU 120, and determine, based on the detected voltage, an operating condition for the battery 110. The BCU 150 can then be configured to send a control signal to each BIU 120 to control each battery 110 such that a bidirectional inverter or PCS coupled with the battery 110 can be configured to manage the voltage output of the battery 110. For example, if the energy storage system 100 requires discharging an output of 400 Volts AC, the BCU 150 can send a control signal to each BIU 120 to control each battery 110 such that the bidirectional inverter or PCS can manage a voltage output (e.g., increase or decrease DC voltage input, increase or decrease AC voltage output, etc.) of each of the batteries 110 within the system 100 for the system 100 to output 400 Volts AC. If the system 100 requires charging to an input of 400 Volts AC, the BCU 150 can similarly send control signals to each BIU 120 such that the bidirectional invertor or PCS can manage a voltage input (e.g., increase or decrease DC voltage input, increase or decrease AC voltage output, etc.) of each of the batteries 110 until the system 100 is fully charged, as another example.

Each of the various types of batteries 110 shown in FIG. 4 may include different capacities. By way of example, the BCU 150 can be configured to detect a voltage output, a capacity, a SoH, and a SoC (State of Charge) of a specific battery 110 within the system 100 based on a signal from the corresponding BIU 120, and determine, based on the detected voltage, capacity, SoH, and/or SoC an operating condition for the battery 110. The BCU 150 can then be configured to send a control signal to each BIU 120 to control each battery 110 such that a bidirectional inverter or PCS coupled with the battery 110 can be configured to manage the voltage and/or current of the battery 110. In various embodiments, the BCU 150 can similarly send control signals to each BIU 120 for charging the system 100 so that the bidirectional invertor or PCS can manage the voltage and/or current (e.g., increase or decrease DC voltage input, increase or decrease AC voltage output, etc.) of each of the batteries 110 until the system 100 is fully charged, as another example.

Each of the various types of batteries 110 shown in FIG. 4 may include different states of health (SoH). By way of example, the BCU 150 can be configured to detect a capacity of a specific battery 110 within the system 100 based on a signal from the corresponding BIU 120, and determine, based on the detected capacity, an operating condition for the battery 110. The BCU 150 can then be configured to send a control signal to each BIU 120 to control each battery 110 such that a bidirectional inverter or PCS coupled with the battery 110 can be configured to manage the voltage and/or current of the battery 110. For example, when a battery 110 reaches a certain threshold (e.g., 40% of its original SoH), the BIU 120 can detect the capacity of the battery 110 and send a signal to the BCU 150. The BCU 150 can then send a control signal back to the BIU 120 to disconnect the battery 110 (e.g., disconnect contactor) so that it can be replaced.

Figure 5:
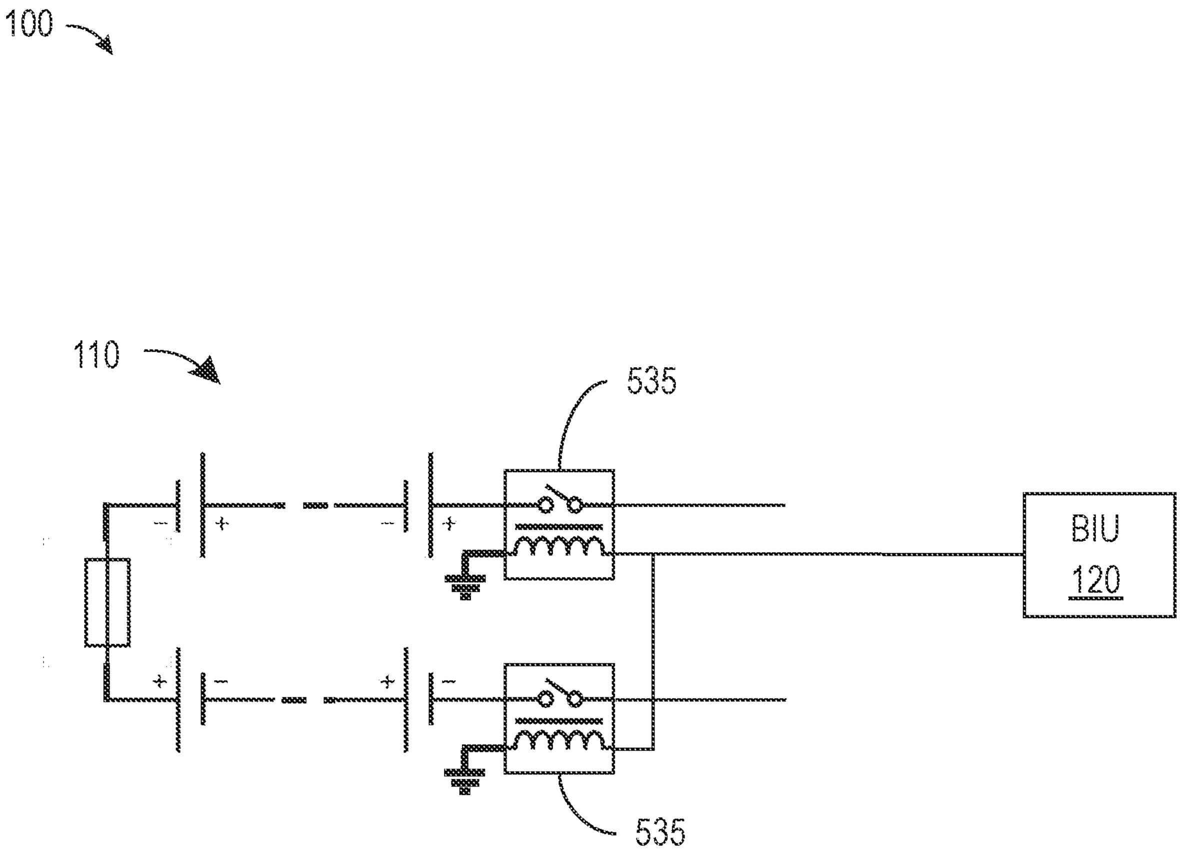
FIG. 5 shows a schematic of a connection between a battery control unit and a battery contactor, according to an exemplary embodiment.

FIG. 5 shows a schematic representation of the BIU 120 operably coupled with a contactor 535 (e.g., switch) of a battery 110, according to an exemplary embodiment. As depicted in FIG. 5, the BIU 120 can operably couple with the contactor 535 of the battery 110 such that the BIU 120 can change the state of power to or from the battery 110 via the contactor 535. For example, the BIU 120 can inhibit power to the battery 110 through the contactor 535. The BIU 120 can increase or decrease power to the battery 110 through the contactor 535 as another example.

Figure 6:
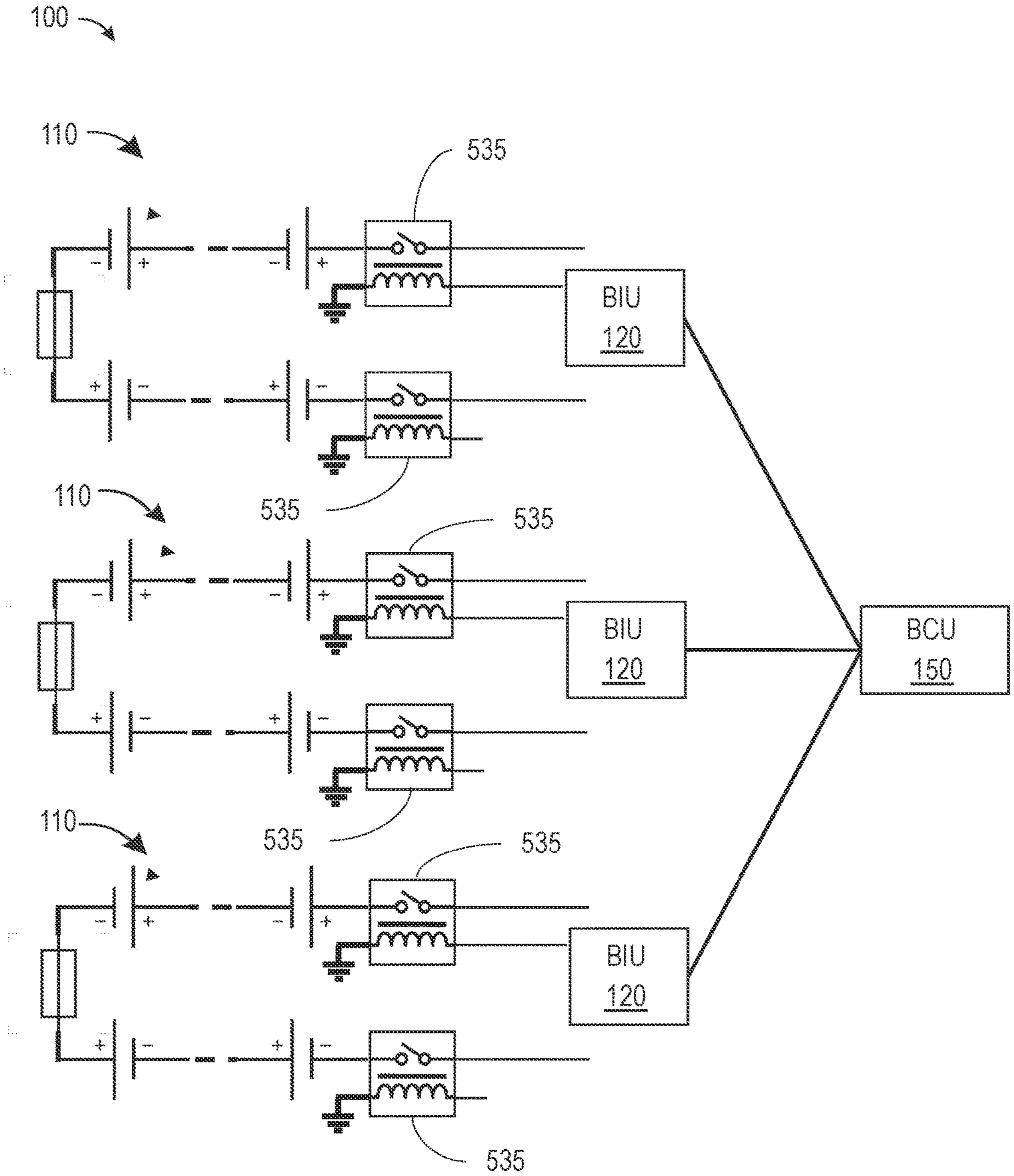
FIG. 6 shows a schematic of a connection between a plurality of battery control units and a central controller to facilitate battery balancing or removal, according to an exemplary embodiment.

FIG. 6 shows a schematic representation of a plurality of batteries 110 within a second life battery energy storage system 100, according to an exemplary embodiment. As shown in FIG. 6, several batteries 110 of various battery configurations can operably couple to the BCU 150. The BCU 150 can be configured to allow connection of multiple BIU 120 units to provide a central control and interface for multiple batteries 110 such that the batteries 110 can be connected in a series or parallel configuration to provide a higher voltage and/or capacity. By way of example, if one battery 110 of the plurality of batteries 110 has a low voltage measurement (e.g., the voltage does not meet a threshold requirement), a signal can be sent to the BIU 120 from the battery 110. The BIU 120 can then process the signal and send a signal to the BCU 150. The BCU 150 can then process the signal and determine, based on the signal, a required operation mode (e.g., on, off, reset, change load, etc.) for the battery 110. The BCU 150 can then send a control signal to the corresponding BIU 120, which can cause the battery 110 to operate based on the control signal and required operation mode. Accordingly, the BCU 150 can control multiple batteries 110 operably coupled with one another such that each battery 110 can operate independently within the energy storage system 100, or can operate together in parallel or series within the energy storage system 100.

In various embodiments, a battery 110 within the energy storage system 100 can be replaced, repaired, or otherwise removed while the energy storage system 100 continues to operate. For example, a first battery 110 can be removed (e.g., detached, disconnected, etc.) from the energy storage system 100 while a second battery 110 remains in the system 100. The second battery 110 can continue to receive and/or send signals to the BIU 120 and the BCU 150 while the first battery 110 is repaired or replaced. In various embodiments, when a battery 110 within the system 100 becomes inoperable (e.g., faulty, defective, etc.), the corresponding BIU 120 can send a signal to the BCU 150. The BCU 150 can then be configured to process the signal and send a control signal to the BIU 120 to disconnect power to the contactors 535. The battery 110 can then be replaced, removed, or exchanged while the BCU 150 continues to operably communicate with the remaining batteries 110 through each respective BIU 120 such that the system 100 can still create a power output or input. In various embodiments, a new recycled EV battery 110 can be added to the system 100 in a similar manner. The battery 110 can operably couple with a BIU 120 to analyze the new battery 110 (e.g., detect capacity, voltage, etc.). The BIU 120 can then send a signal to the BCU 150 to process the detected information and send, based on the signal, one or more control signals back to the BIU 120 for controlling the battery 110 to operate effectively within the system 100. For example, based on the other plurality of batteries 110 within the system 100, the BIU 120 can be configured to control capacity, voltage, or other various factors of the battery 110.

According to another aspect of the present disclosure, a method for using unopened electric vehicle batteries within a renewable energy system includes receiving via a central controller within the energy storage system, a first signal from a first control unit coupled to a first electric vehicle battery of the plurality of electric vehicle batteries; receiving, via a central controller within the energy storage system, a second signal from a second control unit coupled to a second electric vehicle battery of the plurality of electric vehicle batteries; processing, via a processor communicably coupled with the central controller, the first signal received from the first control unit and the second signal received from the second control unit; determining, via the processor, a first performance status of the first electric vehicle battery based on the received first signal and a second performance status of the second electric vehicle battery based on the received second signal; determining, via the processor, a required operating condition for each of the first and second electric vehicle batteries based on the first and second performance statuses; and sending, via the central controller, responsive to the determination of the operating conditions, a first control signal to the first control unit coupled to the first electric vehicle battery and a second control signal to the second control unit coupled to the second electric vehicle battery. In various embodiments, the first control signal causes the first control unit to operate the first electric vehicle battery based on the desired operating conditions and the second control signal causes the second control unit to operate the first electric vehicle battery based on the desired operating conditions. In various embodiments, the first electric vehicle battery includes a different battery configuration than the second electric vehicle battery. For example, the first and second electric vehicle batteries may be reused from different vehicles (e.g., distinct brands, makes, models, etc.). The first and second electric vehicle batteries may include different chemical makeups, different sizes, and different electric configurations (e.g., number of cells, connections, etc.).

The examples included for the disclosure are for clarification purposes only and a large number of other user cases could also be illustrated. The scope of the disclosure should not be limited to only include the user cases shown as examples.

Notwithstanding the embodiments described above, various modifications and inclusions to those embodiments are contemplated and considered within the scope of the present disclosure.

It is also to be understood that the construction and arrangement of the elements of the systems and methods as shown in the representative embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed.

Accordingly, all such modifications are intended to be included within the scope of the present disclosure. Any means-plus-function clause is intended to cover the structures described herein as performing the recited function and not only structural equivalents but also equivalent structures. Other substitutions, modifications, changes, and omissions may be made in the design, operating conditions, and arrangement of the preferred and other illustrative embodiments without departing from scope of the present disclosure or from the scope of the appended claims.

Furthermore, functions and procedures described above may be performed by specialized equipment designed to perform the particular functions and procedures. The functions may also be performed by general-use equipment that executes commands related to the functions and procedures, or each function and procedure may be performed by a different piece of equipment with one piece of equipment serving as control or with a separate control device.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Similarly, unless otherwise specified, the phrase "based on" should not be construed in a limiting manner and thus should be understood as "based at least in part on." Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent Moreover, although the figures show a specific order of method operations, the order of the operations may differ from what is depicted. Also, two or more operations may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection operations, processing operations, comparison operations, and decision operations.

What is claimed is:

1. An energy storage system for reusing unopened second life electric vehicle batteries, comprising:

a plurality of electric vehicle batteries;

a plurality of control units each operably coupled to an electric vehicle battery of the plurality of electric vehicle batteries;

wherein a first electric vehicle battery of the plurality of electric vehicle batteries is from a different manufacturer with a different chemical makeup than a second electric vehicle battery of the plurality of electric vehicle batteries;

a central controller operably coupled to each of the plurality of control units;

wherein the central controller is configured to:

receive a first signal from a first control unit coupled to the first electric vehicle battery and a second signal from a second control unit coupled to the second electric vehicle battery;

determine a status of the first electric vehicle battery based on the received first signal and a status of the second electric vehicle battery based on the received second signal, wherein the status of the first electric vehicle battery is based on a voltage and impedance associated with the first electric vehicle battery and the status of the second electric vehicle battery is based on a voltage and impedance associated with the second electric vehicle battery;

determine an operating condition of the first electric vehicle battery based on the status of the first electric vehicle battery and the status of the second electric vehicle battery; and send, responsive to the operating condition, a control signal to the first control unit coupled to the first electric vehicle battery, wherein the control signal causes the first control unit to operate internal contactors of the first electric vehicle battery to remotely turn the first electric vehicle battery on or off.

2. The energy storage system of claim 1, wherein the central controller is configured to switch the first electric vehicle battery from a first operational mode to a second operational mode based on the control signal while the first electric vehicle battery remains unopened.

3. The energy storage system of claim 1, comprising a user interface communicably coupled with the central controller.

4. The energy storage system of claim 3, wherein:

the central controller is configured to receive a user input signal from a user of the user interface; and the central controller is configured to send a user input control signal to the first control unit coupled to the first electric vehicle battery based on the user input signal.

5. The energy storage system of claim 1, wherein the central controller is configured to send a regulation signal to a bidirectional inverter.

6. The energy storage system of claim 1, wherein the central controller is configured to send an on signal to the first electric vehicle battery via the first control unit such that the first electric vehicle battery is caused to change state while the first electric vehicle battery remains unopened.

7. The energy storage system of claim 1, wherein the internal contactors of the first electric vehicle battery include a first contactor switch and the second electric vehicle battery includes a second contactor switch.

8. The energy storage system of claim 7, wherein the first control unit is operably coupled to the first contactor switch and the second control unit is operably coupled to the second contactor switch.

9. An energy storage system for reusing unopened second life electric vehicle batteries, comprising:

a first reused electric vehicle battery from a first vehicle;

a second reused electric vehicle battery from a second vehicle, the second reused electric vehicle battery from a different manufacturer with a different chemical makeup than the first reused electric vehicle battery;

a first control unit operably coupled to the first reused electric vehicle battery and a second control unit operably coupled to the second reused electric vehicle battery;

a central controller operably coupled to each of the first and second control units;

wherein the central controller is configured to:

receive a first signal from the first control unit coupled to the first reused electric vehicle battery and a second signal from the second control unit coupled to the second reused electric vehicle battery;

determine a status of the first reused electric vehicle battery based on the received first signal and a status of the second reused electric vehicle battery based on the received second signal, wherein the status of the first reused electric vehicle battery is based on a voltage and impedance associated with the first reused electric vehicle battery and the status of the second reused electric vehicle battery is based on a voltage and impedance associated with the second reused electric vehicle battery;

determine a first input of the first reused electric vehicle battery and a second input of the second reused electric vehicle battery;

determine an operating condition of the first reused electric vehicle battery based on the first input and the second input; and send, responsive to the operating condition, a control signal to the first control unit coupled to the first reused electric vehicle battery, wherein the control signal causes the first control unit to operate internal contactors of the first reused electric vehicle battery to remotely turn the first reused electric vehicle battery on or off.

10. The energy storage system of claim 9, wherein the first and second input is further based on a metric of a predetermined threshold corresponding to at least one of an efficiency, charge capacity, discharge capacity, or current associated with the first reused electric vehicle battery.

11. The energy storage system of claim 9, comprising a user interface communicably coupled with the central controller.

12. The energy storage system of claim 11, wherein:

the central controller is configured to receive a user input signal from a user of the user interface; and the central controller is configured to send a user input control signal to the first control unit coupled to the first reused electric vehicle battery based on the user input signal.

13. The energy storage system of claim 9, comprising a bidirectional inverter coupled to the central controller.

14. An energy storage system for reusing unopened second life electric vehicle batteries, comprising:

a plurality of electric vehicle batteries;

a plurality of control units each operably coupled to an electric vehicle battery of the plurality of electric vehicle batteries;

wherein a first electric vehicle battery of the plurality of electric vehicle batteries is from a different manufacturer with a different chemical makeup than a second electric vehicle battery of the plurality of electric vehicle batteries;

a central controller operably coupled to each of the plurality of control units;

wherein the central controller is configured to:

receive a first signal from a first control unit coupled to the first electric vehicle battery and a second signal from a second control unit coupled to the second electric vehicle battery;

determine a first performance status of the first electric vehicle battery based on the received first signal and a second performance status of the second electric vehicle battery based on the received second signal, wherein the first performance status is based on a voltage and impedance associated with the first electric vehicle battery and the second performance status is based on a voltage and impedance associated with the second electric vehicle battery;

determine an operating condition for each of the first electric vehicle battery and the second electric vehicle battery based on the first performance status and the second performance status; and send, responsive to the operating condition, a control signal to the first control unit coupled to the first electric vehicle battery and a control signal to the second control unit coupled to the second electric vehicle battery to operate internal contactors of the first electric vehicle battery and the second electric vehicle battery based on the operating conditions to remotely turn the first electric vehicle battery and the second electric vehicle battery on or off.

15. The energy storage system of claim 14, wherein the first performance status is further based on a metric of a predetermined threshold corresponding to at least one of an efficiency, charge capacity, discharge capacity, or current associated with the first electric vehicle battery.

16. The energy storage system of claim 14, wherein the central controller is configured to provision the first performance status of the first electric vehicle battery to a user interface configuration.

17. The energy storage system of claim 16, wherein the central controller is configured to:

receive, from the user interface configuration, a signal corresponding to a user input; and send a control signal to the first control unit based on the signal corresponding to the user input.

18. The energy storage system of claim 14, wherein the central controller is configured to send an on signal to the first electric vehicle battery via the first control unit such that the first electric vehicle battery is caused to change state while the first electric vehicle battery remains unopened.

19. The energy storage system of claim 14, wherein the central controller is configured to send an off signal to the first electric vehicle battery via the first control unit such that the first electric vehicle battery is caused to change state while the second electric vehicle battery remains in an active state.

20. The energy storage system of claim 14, wherein the first control unit is configured to couple to a battery interface of the first electric vehicle battery via a battery interface cable.

* * * * *